April 5, 1960 — A. J. RANDALL — 2,931,413
TRACTION DEVICE
Filed Sept. 19, 1958 — 2 Sheets-Sheet 1

INVENTOR.
ANTHONY J. RANDALL
BY Harry H. Hitzeman
ATTORNEY.

April 5, 1960  A. J. RANDALL  2,931,413
TRACTION DEVICE
Filed Sept. 19, 1958  2 Sheets-Sheet 2
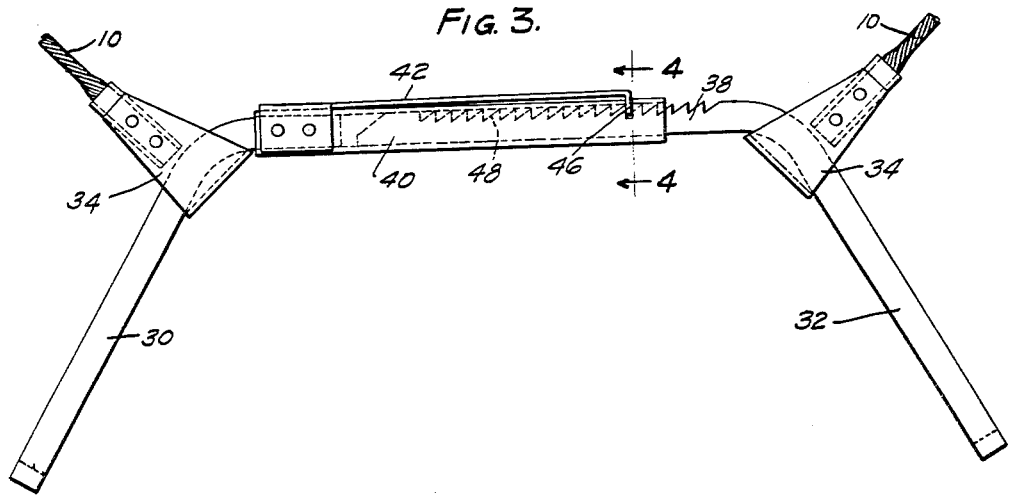
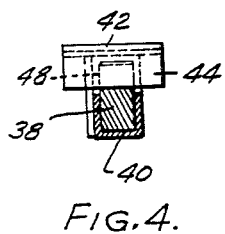
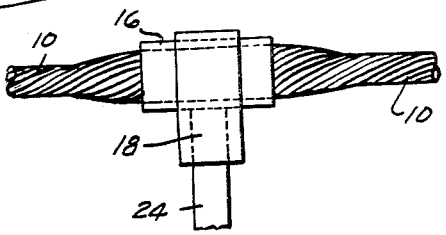
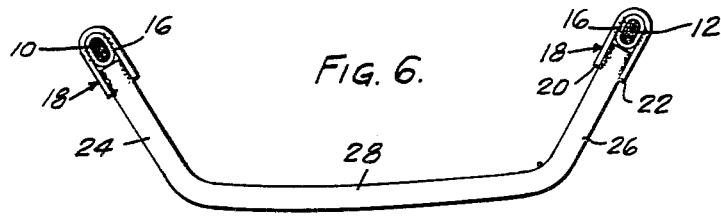
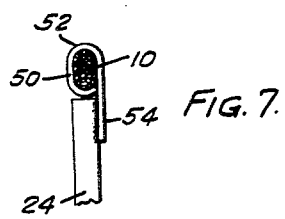
INVENTOR.
ANTHONY J. RANDALL
BY
Harry H. Hitzeman
ATTORNEY.

ND Patent Office
2,931,413
Patented Apr. 5, 1960

2,931,413

TRACTION DEVICE

Anthony J. Randall, Westville, Ill.

Application September 19, 1958, Serial No. 762,059

2 Claims. (Cl. 152—219)

My invention relates to improvements in traction devices for pneumatic tires.

My invention relates more particularly to a quickly attachable or detachable traction device which includes a pair of flexible cable or wire rope members having spaced traction bars connected between the same and a telescoping connector unit disposed on the outside of the tire, easily accessible so that attachment or removal is accomplished in a matter of seconds.

The principal object of the present invention is to provide an improved traction device for pneumatic tires that is easily and quickly attachable or detachable and yet when attached will maintain its position on a pneumatic tire indefinitely.

A further object of the invention is to make a device of the type described which is capable of adjustment upon a pneumatic tire so that the same size traction unit may be utilized on pneumatic tires of various sizes.

A further object of the invention is to provide a traction device of the type described made of two connected partial circles of steel cable connected together at spaced intervals by rigid cross bars, the cables being generally rigid but capable of being sprung open from their normal diameter so they may have their open ends passed over a wheel and tire and then return to normal condition tightly hugging the tire due to the resiliency in the same.

A further object of the invention is to provide a traction device of the type described which is of comparatively light weight and easy to handle and which may be attached to a tire even though the same is mired in mud or other substance where it is necessary to provide traction of remove the same.

A furhter object of the invention is to provide an improved traction unit of the type described that is easily and economically manufactured, and one which will be durable in construction and will not easily become broken or out of order even though subjected to long and hard usage.

Other objects and advantages will be more apparent from the following description wherein reference is had to the accompanying drawings, upon which:

Fig. 3 is an enlarged fragmentary view of the telescoping connector member between the opposite ends of one of the flexible cables;

Fig. 4 is a cross-setcional view thereof taken on the line 4—4 of Fig. 3;

Fig. 5 is a full size fragmentary view of one of the traction bars and its connection to the flexible cable;

Fig. 6 is a cross-sectional view showing the traction bar connected to the two flexible cable members and is taken on the line 6—6 of Fig. 1;

Fig. 7 is a fragmentary sectional view showing a modified form of connection between the traction bar and the flexible cable; and Fig. 8 is a view similar to Fig. 6 showing a modified form of traction bar and connection to the spaced parallel cable members.

Figure 1:
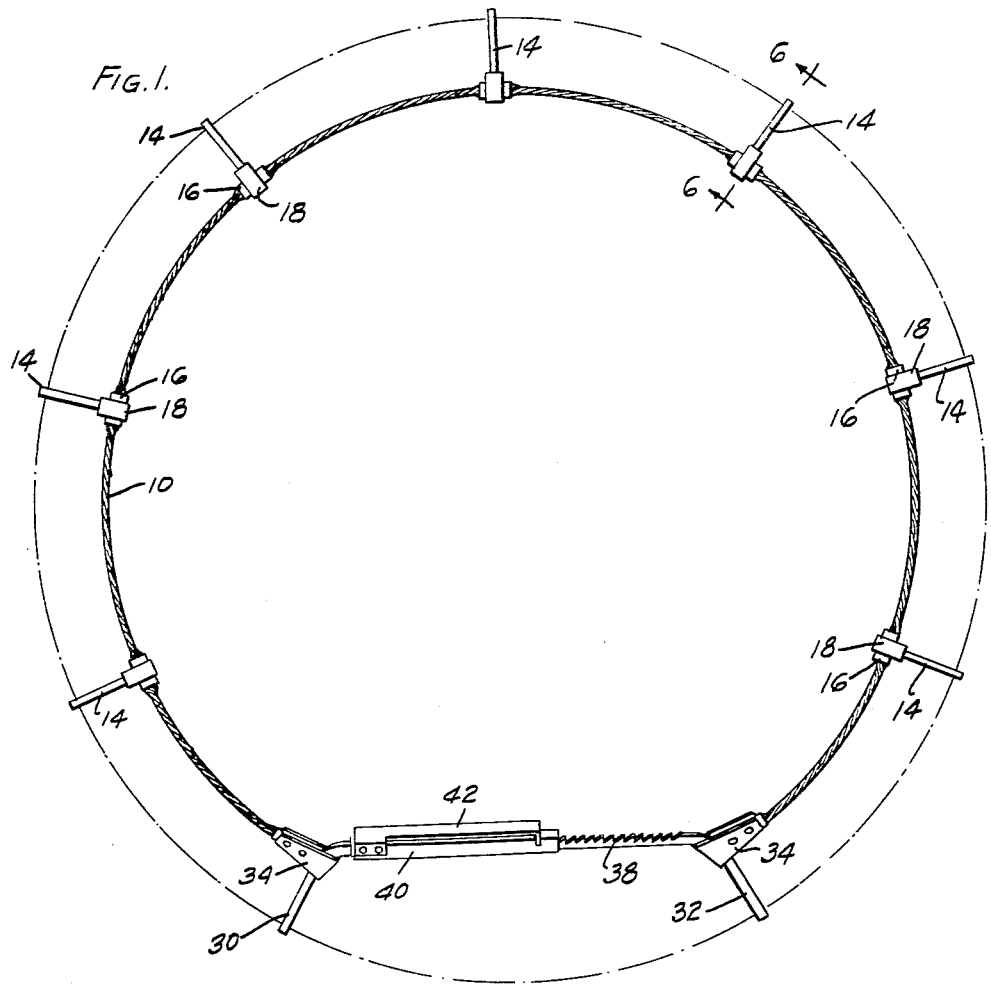
Fig. 1 is a side elevational view of the traction unit in place upon a pneumatic tire, the outline of the tire being shown in dot-dash lines.
Figure 2:
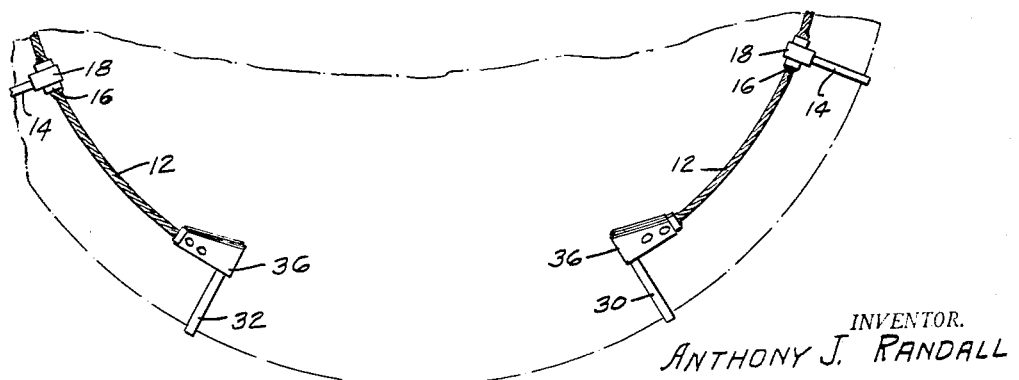
Fig. 2 is a fragmentary elevation from the opposite side of the tire.

In the embodiment of the invention which I have chosen to illustrate and described the same, the traction unit may generally consist of a pair of partially circular flexible cable members 10 and 12 connected together at spaced points about their peripheries by traction bars 14. The members 10 and 12 are steel cable members of a specific partial circle of a fixed diameter and are capable of being sprung open by grasping the open ends of the same to pass them over a wheel and tire, and they will then spring back to the original fixed diameter about the tire.

As best shown in Figs. 5 and 6, the flexible wire cables 10 and 12 are flattened and encased for a short distance in an elongated ring member 16. Each of the ring members 16 has a U-shaped strap member 18 bent around the same and welded thereto. The extended legs 20 and 22 of the member 18 are adapted to be welded to opposite sides of the legs 24 and 26 of the arcuately shaped traction bars 28.

In this manner when a plurality of traction bars are connected between the flexible cables 10 and 12 as shown, a circular tire enclosing structure is formed. The ends of the cable 10 are fastened to a pair of clip members 34, and the ends of the cable 12 are fastened to clip members 36. Each of the clip members 36 receives one end of each of the traction bars 30 and 32, which end is welded or otherwise securely fastened in the clip members 36. The opposite ends of the traction bars 30 and 32 are received in the clip members 34, the traction bars 32 having a toothed extension 38 which is telescopically received in a box-like housing 40 that is connected to the end of the traction bar 30. The traction bar 30 also has a flat spring tension member 42 mounted on the housing 40, the tension member 42 having a downwardly extending dog portion 44 which is guided in a pair of slots 46 in the housing 40 and which may engage in the teeth of the leg 48 on the extension 38 of the traction bar 32.

In applying the traction unit above described to a pneumatic tire, it is only necessary to drape the same over the tire and then by inserting the toothed extension 38 of the traction bar 32 in the tubular housing 40 on the end of traction bar 30 and raising the spring member 42, the traction bars 30 and 32 can be pushed together until the traction unit fits snugly about the pneumatic tire. The spring member 42 and dog 44 will thus engage in the leg 48 and fixedly hold the traction member in place on the tire.

In Fig. 7 I have shown a modified form of connection between the cable 10 and the traction bar 28. In this construction I form an elongated loop 50 in the end of a strap member 52, the loop being formed about the flexible cable to fixedly hold the same in place on the cable. The loop has an extension 54 which may be welded or otherwise secured to the leg 24 of the traction bar 28.

In Fig. 8 I have shown a further modified form of connecting the cross-bars between the spring cables. In this construction the cross-bar 14a may be a flat metal strap having its two ends bent up at an angle as shown. The ends are then bent as shown at 14b to crimp over and around the cable members 10 and 12, deforming them at the point of crimping so that the ends of the cross-bars are fixedly held against lateral movement on the steel cables. The extended ends 14c are bent back around the cables against the angularly bent ends of the same. This is a quick, easy and effective way to fasten the cross-bars to the cables.

From the above and foregoing description it can be seen that I have provided a comparatively simple yet usually strong and easily manipulated traction unit which can be placed on a tire in a few seconds, and by drawing together the traction bars 30 and 32 the entire unit is locked upon the tire by means of the telescopic connection provided.

I contemplate that changes and modifications may be made in the exact details shown and I do not wish to be limited in any particular; rather what I desire to secure and protect by Letters Patent of the United States is:

1. A traction unit for a pneumatic tire which consists of a pair of partial circular flexible cables, rigid traction bars connected between the same at spaced points about their periphery, each traction bar being generally U-shaped and fixedly connected at the ends of its legs to each of said cables and an adjustable connector between the ends of one only of said flexible cables, said adjustable connector including an arm rectangular in cross-section forming a part of and extending laterally from one end of one of said traction bars, a laterally extending U-shaped housing to receive said arm connected to the end of an adjacent traction bar, said laterally extending arm having a toothed surface thereon, a dog member, said dog member comprising a flat spring mounted on said housing adjacent the back end of the same and having a transverse shoulder for engaging said toothed surface of said laterally extending arm to connect said traction bars together to secure said traction unit about a tire, said housing having slots in the side walls of the same, said shoulder guided therein and said dog member covering the top of said U-shaped housing.

2. A traction unit for a pneumatic tire which has a pair of partial circular steel cables generally rigid but capable of slight out-of-round springing action to encompass a tire on a wheel without raising the wheel from the ground, a plurality of equally spaced cross bars connecting said steel cables and being fastened thereto by bending the ends of said cross bars around and crimping them on said cable, and an adjustable connector between the ends of only one of said flexible cables, said adjustable connector including an arm rectangular in cross-section forming a part of and extending laterally from one end of one of said traction bars, a laterally extending U-shaped housing to receive said arm connected to the end of an adjacent traction bar, said laterally extending arm having a toothed surface thereon, a dog member, said dog member comprising a flat spring mounted on said housing adjacent the back end of the same and having a transverse shoulder for engaging said toothed surface of said laterally extending arm to connect said traction bars together to secure said traction unit about a tire, said housing having slots in the side walls of the same, said shoulder guided therein and said dog member covering the top of said U-shaped housing.

References Cited in the file of this patent
UNITED STATES PATENTS

| | | |
|---|---|---|
| 1,455,408 | Olson | May 15, 1923 |
| 2,493,994 | Newman | Jan. 10, 1950 |
| 2,505,102 | Davis | Apr. 25, 1950 |